United States Patent Office
3,316,227
Patented Apr. 25, 1967

3,316,227
PREPARATION OF 1,1-DISUBSTITUTED
DIUNSATURATED COMPOUNDS
Arthur H. Gerber, Erie, Pa., assignor to Lord Corporation, a corporation of Pennsylvania
No Drawing. Filed Oct. 18, 1963, Ser. No. 317,135
20 Claims. (Cl. 260—88.7)

The present invention relates to novel 1,1,-disubstituted diunsaturated compounds, specifically 1,1-disubstituted-1,3-butadienes and 1,1-disubstituted-1-butene-3-ynes,[($\beta,\beta$-disubstituted vinyl) acetylenes] and to a novel method of making 1,1-disubstituted diunsaturated compounds, including the aforesaid novel compounds.

Certain 1,1-disubstituted dienes are known. Patent 2,466,395 discloses 1,1-dicyano-1,3-butadiene, and patent 2,956,878 discloses 1,1-dicarboxy-1,3-dienes, which also have one or more substituents in the 4 position, and the corresponding esters. Thielcke et al. [J. Org. Chem., 15, 1241 (1950)] disclose the preparation of 1-p-nitrophenyl-1-carboxyl butadiene-1,3 by condensing acrolein with p-nitrophenyl-acetic acid using sodium acetate as catalyst and a mixture of dioxane and acetic anhydride as solvent. Thielcke et al. point out that, when the acetates of calcium, cadmium, zinc and tin were used as catalyst, none of the desired product was obtained. The condensation of acrolein and other aldehydes with p-nitrophenylacetic acid using sodium acetate as catalyst is disclosed by Gunst et al. [J. Am. Chem. Soc., 76, 3595 (1954)].

The novel compounds of the present invention possess advantageous utility, especially in the fields of adhesives and coatings, not possessed by the known compounds. The novel method of the present invention, although particularly applicable to the preparation of the stated novel compounds, is not limited to the production thereof, and represents an improvement in the production of a somewhat broader class of 1,1-disubstituted diunsaturated compounds.

It is the principal object of the present invention to provide novel 1,1-disubstituted diunsaturated compounds, specifically novel 1,1-disubstituted butadienes-1,3 and 1,1-disubstituted-1-butene-3-ynes [($\beta,\beta$-disubstituted vinyl) acetylenes].

It is another principal object of the present invention to provide a novel process for preparing 1,1-disubstituted diunsaturated compounds, including the novel compounds of the present invention.

These and other objects, including the provision of the products in homopolymeric form, will become apparent from a consideration of the following specification and claims.

The novel compounds of the invention are 1,1-disubstituted diunsaturated compounds having a formula selected from the group consisting of (I)
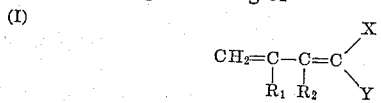

and (II)
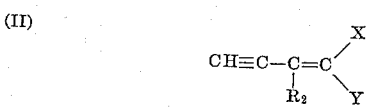

where $R_1$ is selected from the group consisting of hydrogen, alkyl groups containing from 1 to 5 carbon atoms, phenyl and halogen; where $R_2$ is selected from the group consisting of hydrogen and methyl, and where X and Y are dissimilar and are separately selected from the group consisting of cyano, carbethoxy, ethyl, sulfone, phenyl sulfone, formyl, acetyl, benzoyl, diethyl, phosphonyl, amide and phenyl.

The novel method of the invention comprises mixing (1) an $\alpha,\beta$-unsaturated carbonyl compound having a formula selected from the group consisting of (III)

and (IV)

(2) an active methylene compound having the formula (V)

and, (3) as catalyst, at least one metal salt having a cation selected from the group consisting of zinc, copper, manganese, chromium, cobalt, nickel, calcium, magnesium and lithium and an anion selected from the group consisting of halogens having an atomic weight of at least 35, nitrate and carboxylates having from 1 to 18 carbon atoms; where $R_1$ is selected from the group consisting of hydrogen, alkyl groups containing from 1 to 5 carbon atoms, phenyl and halogen; where $R_2$ is selected from the group consisting of hydrogen and methyl, and where X and Y are electron-withdrawing groups, X being selected from the group consisting of cyano, carbethoxy, ethyl sulfone, phenyl sulfone, formyl, acetyl, benzoyl, diethyl phosphonyl, amide and phenyl and Y being selected from the group consisting of cyano, carbethoxy, ethyl sulfone, phenyl sulfone, formyl, acetyl, benzoyl, diethyl phosphonyl and amide, provided that when X is phenyl the catalyst selected is a carboxylate and $R_1$ and $R_2$ are each hydrogen.

Referring further to the method, one starting material will be an $\alpha,\beta$-unsaturated carbonyl compound having the Formula III or IV. Such compounds having the Formula III are acrolein; $\alpha$-substituted acroleins where the substituent corresponds to $R_1$ such as $\alpha$-chloracrolein, $\alpha$-bromacrolein, $\alpha$-iodacrolein, $\alpha$-fluoracrolein, $\alpha$-methyl-acrolein, $\alpha$-ethylacrolein, $\alpha$-(n-propyl) acrolein, $\alpha$-(n-butyl)acrolein, $\alpha$-(n-amyl)acrolein, and the like; and methyl vinyl ketone when $R_2$ is methyl. $\alpha,\beta$-Unsaturated carbonyl compounds having the formula IV are propargyl aldehyde, when $R_2$ is hydrogen, and methyl ethynyl ketone, when $R_2$ is methyl.

Still with respect to the method, X and Y in Formula V are known electron-withdrawing groups and, as far as the method is concerned, may be the same or different. X may be cyano (—CN), carbethoxy (—COOC$_2$H$_5$), ethyl sulfone (—SO$_2$C$_2$H$_5$), phenyl sulfone (—SO$_2\phi$)

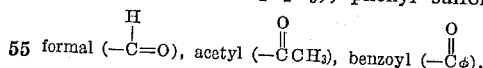

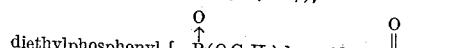

and phenyl ($\phi$). Y is selected from the same class of electron-withdrawing groups except phenyl; in other words, in the active methylene compound (V) X and Y will not both be phenyl. Examples of suitable active methylene compounds where X and Y are dissimilar are ethyl cyanoacetate, cyanomethyl ethyl sulfone, phenyl 2-propanone, cyanoacetamide, phenyl-acetaldehyde, benzyl cyanide, cyanomethyl phenyl sulfone, diethylphosphone-acetonitrile, benzoyl acetonitrile, and the like. Examples of active methylene compounds where X and Y are the same are diethyl malonate, malononitrile, and the like.

In accordance with the method of the present invention, the $\alpha,\beta$-unsaturated carbonyl compound (III or IV) and the active methylene compound (V) are contacted with a particular catalyst. The catalyst will be a metal salt or mixture of metal salts, the anion of which will be a halogen having an atomic weight of at least 35, that is chloride, bromide or iodide, nitrate or a carboxylate group having from 1 to 18 carbon atoms. The carboxylate group may be aliphatic or cyclic, saturated or unsaturated; although the preferred carboxylate groups are saturated aliphatic groups, such as formate, acetate, butyrate, caproate, octanoate, laurate, palmitate, myristate, stearate and the like. Examples of other carboxylate groups which may be used are salicylate, phthalate, malonate, lactate, pyruvate, and the like. The cation of the salt will be selected from certain metals, namely, zinc, copper, manganese, chromium, cobalt, nickel, calcium, magnesium and lithium. Of these zinc is generally preferred. Examples of catalyst salts are zinc chloride, zinc bromide, zinc iodide, lithium bromide, lithium iodide, lithium nitrate, manganous chloride, chromium trichloride, calcium chloride, calcium nitrate, lithium chloride, zinc nitrate, zinc acetate dihydrate, lithium acetate dihydrate, cobaltous octanoate, nickel octanoate, lithium octanoate, copper octanoate, copper stearate, lithium salicylate, lithium malonate, lithium phthalate, lithium lactate, lithium pyruvate, and the like. Combinations of two or more of such salts may be used. For example, a combination of zinc chloride and zinc acetate dihydrate is particularly useful.

It will be noted that the foregoing salts vary as to degree of acidity; for example lithium octanoate would, in water, give a pH near neutrality whereas zinc chloride is significantly acid. It has been found, according to the present invention, that there is a preferred relationship, insofar as production of the compounds in monomeric form in concerned, between the acidity of the system and the electron-withdrawing power of the X and Y groups in the active methylene compound (V), and also of $R_1$ in III when other than hydrogen, in that the stronger the electron-withdrawing power the greater the acidity of the system should be and conversely. Thus, as stated above, when X is phenyl, which has the least electron-withdrawing power of those groups mentioned, the preferred catalyst would be a carboxylate.

The solvent, if any, selected may also influence the acidity of the system, and should not be of such nature, like an amine, which would, in water, provide a pH above 7.5. The solvent employed will be an organic liquid in which the principal reactants and catalyst are soluble at least to the extent of initiating the reaction. Examples of suitable solvents are: aromatic hydrocarbons, like benzene, toluene and xylene; chlorinated hydrocarbons like chloroform, chlorobenzene and methylene chloride; acids, like acetic acid and octanoic acid; acid anhydrides, like acetic anhydride; esters, like ethylacetate, ethyl benzoate and butyl propionate; alcohols, like ethanol and isopropanol; halogenated alcohols, like 2-chloroethanol and trifluoroethanol; ethers, like 1,2-dimethoxyethane, dioxane, tetrahydrofuran and anisole; dimethylsulfoxide, butyrolactone and the like. It will be seen that the foregoing solvents differ as to degree of acidity, with the acids and anhydrides being the most acid, followered by trifluoroethanol and then 2-chloroethanol, and dimethylsulfoxide being the least acid, providing a pH in water of about 7 or slightly greater up to 7.5 depending upon concentration. The remaining solvents, namely the aromatic hydrocarbon, chlorinated hydrocarbons, alcohols, esters and ethers, are neutral and lie between these extremes. When the active methylene compound or the $\alpha,\beta$-unsaturated carbonyl compound is a polar liquid it may be used as the solvent either by itself or in conjunction with another solvent.

Reference has been made above to electron-withdrawing power of the X and Y groups of the active methylene compound (V). Electron-withdrawing power of substituents is a known concept and may be expressed in terms of the Hammett para $\sigma$(sigma) constants. A table of these constants (not those derived from substituted anilines and phenols) for common substituents is set forth on page 72 of Physical Organic Chemistry, Hine, McGraw Hill Co. (1956), and it will there be seen that of the substituents listed above for X, phenyl has the lowest constant (+0.009); that is, it has the least electron-withdrawing power. On the other hand, of the substituents listed above for X and Y the sulfonyl groups have about the greatest electron-withdrawing power (a larger +value). It should be realized that the Hammett constants are not absolute values but are relative at best, since much depends upon: the particular reaction involved; the presence or absence of other substituents and their nature; steric effects, and the like. Since there are two electron-withdrawing groups, X and Y, it may be considered that the powers of both are substantially additive. When $R_1$, in III is other than hydrogen, it will have electron-withdrawing power, depending upon its nature, and this substituent too may be taken into consideration in the light of this discussion.

The reason for the desirability of correlating the acidity of the system with the electron-withdrawing power of the X and Y groups of the active methylene compound (and $R_1$ when other than hydrogen) may be explained as follows: Basic conditions favor the reaction between the $\alpha,\beta$-unsaturated carbonyl compound (III and IV) and the active methylene compound (V). However, basic conditions also favor the polymerization of the products (I and II), and the rate of polymerization increases as the stated electron-withdrawing power increases. For example, in reacting $\alpha$-chloracrolein with malononitrile, wherein there are three electron-withdrawing groups (two cyano groups which are relatively strong, and a chloro group), a strongly acidic solvent, like acetic acid or acetic anhydride, or a strongly acidic catalyst, like zinc chloride, are advantageous in order to achieve greater stability and, hence, yield of the monomeric diene. On the other hand, in reacting acrolein with phenyl 2-propanone, a non-acid carboxylate catalyst, like cobalt octanoate, in a non-acid solvent, like dimethylsulfoxide, would be advantageous. Ethyl cyanoacetate, which contains two strongly electron-withdrawing groups, can be rapidly condensed with acrolein using zinc chloride in dimethylsulfoxide; however, the yield of monomer is low due to substantial polymerization. In this case, the yield of monomer can be improved by substituting a neutral solvent, like dioxane or ethylacetate, for the dimethylsulfoxide. Benzyl cyanide does not react with acrolein in dimethylsulfoxide containing zinc chloride and zinc acetate, but does react in the same solvent containing a less acid catalyst, like lithium- or copper octanoate. A small amount (on the order of 0.1%) of a strong mineral acid, like hydrochloric acid or sulfurous acid, can sometimes be tolerated, for example to aid in the stabilization of the monomeric product. However, large amounts of such strong acids effectively retard the condensation reaction and thus should be avoided.

It will be seen from the foregoing that for any combination of an $\alpha,\beta$-unsaturated carbonyl compound (III and IV) and an active methylene compound (V) conditions can be adjusted through selection of catalyst, and solvent if used, to correlate electron-withdrawing power with acidity such that the greater the sum of the electron-withdrawing power of X and Y and of $R_1$ when other than hydrogen, within the range from the minimum to the maximum provided by the reactants described herein, the greater the acidity (that is, the lower the pH) within the range from about 3 to 7.5. Thereby, desired reaction to monomeric product (I and II) proceeds and substantial polymerization thereof is inhibited.

A very general quantitative correlation that may be made concerns the summation (designated by Z) of the electron-withdrawing powers (Hammett para $\sigma$ values cited by Hine, supra) of the X and Y substituents and the pH range (whether it be due to the catalyst or solvent or both) of the reacting environment. That is, if Z is at least +0.95 (+0.95 or greater) the preferred operating pH range is between about 3 and about 5, but if it is no greater than +0.75 (+0.75 or less) a pH range of at least 7 (up to about 7.5) is preferred. Of course, where Z has an intermediate value, an intermediate pH is suggested. This generalization may lose its validity when $R_1$ in III is other than hydrogen, since steric as well as electronic effects become operative and the manner and extent to which each will be manifested will depend upon the particular compounds employed. Since the present process deals with a non-aqueous system, reference to pH, as above, refers to pH as determined after addition of the material to water.

The foregoing discussion has dealt with preferred conditions adapted to favor production of the products in monomeric form. It is apparent that conditions may be selected which favor polymerization and hence production of the product in homopolymeric form. The production of the present products in homopolymeric form or in mixed monomeric form and homopolymeric form as well as substantially in monomeric form is contemplated by the present invention.

In carrying out the reaction the $\alpha,\beta$-unsaturated carbonyl compound (III and IV) and active methylene compound (V) are mixed, in the presence of the catalyst, and an organic liquid medium which may be provided, in whole or in part, by the active methylene compound itself or the $\alpha,\beta$-unsaturated carbonyl compound itself or by a solvent as discussed above. The reaction theoretically requires one mol of $\alpha,\beta$-unsaturated carbonyl compound for each mol of active methylene compound. In practice it is preferred to employ some excess, at least 20% excess, of the former. Since the $\alpha,\beta$-unsaturated carbonyl compound may serve as part or all of the solvent, there is no maximum limit to the excess except that dictated by providing a satisfactory reaction environment. Even when another solvent is used, several hundred percent excess of a $\alpha,\beta$-unsaturated carbonyl compound has been used. Likewise, when the active-methylene compound serves as solvent, it will be in excess as illustrated in Example XXVIII. When another solvent is used, the mol ratio of the $\alpha,\beta$-unsaturated carbonyl compound to active methylene compound is generally between about 1 and about 1.3, preferably approximately 1.2, mols of the former per mol of the latter. The amount of catalyst employed may vary over a wide range. In general, the greater the proportion of catalyst the higher the rate of the reaction; but this does not necessarily means the best yields. Amounts of catalyst as little as about 0.01 mol and as high as about 1 mol thereof, per mol of active methylene compound may be used. In accordance with preferred practice, the catalyst is employed in an amount between about 0.1 and about 0.7 mol thereof per mol of active methylene compound.

The products of the present invention polymerize more readily at elevated temperatures, and, where production of the product in monomeric form is to be favored, it is usually desirable to run the reaction at the lowest possible temperature consistent with achieving a reasonable rate of reaction. However, there does not appear to be anything critical as to reaction temperature as a general matter, beyond freezing or thermal decomposition of materials employed. Subzero temperatures as well as elevated temperatures have been used. In general the temperatures of these reactions will range between about −15 and about 80° C., with a temperature between about 10 and about 60° C. being most often employed. In this connection, the use of an antioxidant, such as butyl catechol or hydroquinone, is desirable at elevated temperatures to prevent undue side reactions involving the $\alpha,\beta$-unsaturated carbonyl compound.

Usually the water produced during the condensation reaction has no significant deleterious effect. However, polymerization of the more reactive monomer products can be initiated by water, and in those cases yields of monomeric product may be improved by employing a drying agent to take up, or react with, the water formed during the condensation reaction. Examples of suitable drying agents are sodium sulfate, silica gel, alumina, calcium sulfate and acid anhydrides, such as acetic anhydride or propionic anhydride.

The product may be recovered from the reaction mixture by procedures known in the art. For example, the reaction mixture may be mixed with a selective solvent for the product, such as a mixture of equal parts of diethyl ether and petroleum ether. The product can be recovered from the organic layer preferably after extracting one or more times with dilute aqueous hydrochloric acid or acidic aqueous methanol, by evaporation of the solvent.

The following examples are given for the purpose of illustration only and are not intended to limit the scope of the invention in any way. In the examples which refer to gas chromatographic analysis: the instrument employed is a Beckman GC–2A with column No. 74346 consisting of silicone 550 deposited on firebrick, and the retention times, given in minutes from the air peak, are for materials injected in solution and are relative to those of the parent active methylene compound (V) where values appear in parenthesis:

*Example 1*

Five grams of zinc chloride are stirred, while heating, in 20 cc. of dioxane. The mixture is cooled to room temperature, and 6.5 cc. (.06 mol) of ethyl cyanoacetate and then 5 cc. (.075 mol) of acrolein are added. After stirring for 3 hours at room temperature, gas chromatographic analysis shows that approximately 90% of the ester has reacted. The product is isolated by mixing the reaction solution with 50 cc. of petroleum ether and then extracting three times with 100 cc. portions of cold dilute hydrochloric acid. The organic layer is dried and the solvent is removed to give 6.2 gm. (68% yield) of crystalline 1-cyano-1-carbethoxy butadiene-1,3 as determined by gas chromatographic analysis [retention time of 8½ (3), at 190° C. at a helium pressure of 25 p.s.i.]. Upon recrystallization from petroleum ether-ethyl ether, the product has a melting point of 39–40° C.

Calculated: C, 63.5; H, 6.0; N, 9.3. Found: C, 63.2; H, 6.1; N, 9.1.

The composition of this product is further confirmed by preparation of its Diels-Alder adduct with anthracene.

A 100 cc. flask is charged with 5.0 gm. (ca. 96–97% assay) of 1-cyano-1-carbethoxy butadiene-1,3, 20.0 cc. acetone and then 2 drops piperidine are added (0.7 weight percent amine catalyst on monomer). The solution is gently agitated and then allowed to stand at room temperature for 60 minutes. Petroleum ether (50 cc.) is then added to precipitate the resulting polymer. The solvents are poured off and the gum washed further with 2×50 cc. portions of ether-petroleum ether (1:1) and finally allowed to stand several hours in 100 cc. of mixed solvent. The solvent is decanted off and product dried under vacuum to give 4.55 gm. (91% yield) solid, M.P. 56–57°.

Elemental analysis: percent C, 63.7; H, 6.3; N, 9.3.
Calculated for $(C_8H_9NO_2)_n$: C, 63.5; H, 6.0; N, 9.3.

*Examples II–VIII*

These examples also illustrate the preparation of 1-cyano-1-carbethoxy butadiene-1,3 using various catalyst and solvent systems. The procedure set forth in Example I is followed, but the specific materials employed, amounts thereof, times, temperatures and yields are set forth in the following Table I for convenience. In the table, "A" refers to acrolein and "ECA" refers to ethyl cyanoacetate:

acetate in 20 cc. of acetic anhydride containing 0.05 gm. of hydroquinone, 1 cc. of acetic acid, 0.00627 mol of o-

TABLE I

|  | II | III | IV | V | VI | VII | VIII |
|---|---|---|---|---|---|---|---|
| Amt. A. (cc.) | 5 | 2.5 | 2.5 | 5 | 2.5 | 2.5 | 2.5. |
| Amt. ECA (cc.) | 6.5 | 3.3 | 3.3 | 6.5 | 3.3 | 3.3 | 3.3 |
| Catalyst | Zinc acetate dihydrate. | Manganous chloride. | Chromium trichloride. | Cobaltous octanoate. | Zinc chloride | Calcium chloride. | Lithium chloride. |
| Amt. Cat. (gm.) | 5 | 2.5 | 2.5 | 1.5 | 2.5 | 2.5 | 2.5 |
| Solvent | Tetrahydrofuran. | Isopropanol | Isopropanol | Benzene [1] | 2-chloro-ethanol.[2] | 2-chloro-ethanol.[2] | Tetrahydrofuran. |
| Amt. Solvent (cc.) | 20 | 10 | 10 | 15 | 10 | 10 | 10. |
| Time (hrs.) | 5 | 1 | 20 | 2½ | 5 | 70 | ½. |
| Temp | Room | Room | Room | Room | 3–10° C | Room | 15–20° C. |
| Yield (percent) | 23 | 52 [3] | 6 | 52 | 59 | 25 | 5. |

[1] Also contains 5 gm. anhydrous silica gel.
[2] Contains approximately 0.1% hydrogen chloride.
[3] Under comparable conditions, but using no catalyst, less than 0.5% yield is obtained.

By substituting magnesium chloride for the calcium chloride in Example VII, substantially the same results are obtained.

*Examples IX–XI*

These examples illustrate the preparation of 1-cyano-1-carbethoxy butadiene-1,3 using acrolein ("A") and ethyl cyanoacetate ("ECA") at room temperature with other catalyst and solvent systems, and are set forth for convenience in tabular form:

phthalic acid and 0.00235 mol of lithium phthalate (prepared in situ from 0.24 gm. of lithium acetate dihydrate and 1.43 gm. of o-phthalic acid), for 2 hours at 70° C.

In the following examples compounds other than 1-cyano-1-carbethoxy butadiene-1,3 are prepared. The general procedure of Example I is followed; however, reactants, catalyst and solvent, and amounts thereof, as well as reaction temperature and time are varied. To avoid repetition, only the essential differing information is set forth:

TABLE II

|  | IX | X | XI | XII |
|---|---|---|---|---|
| Amt. A (cc.) | 2.5 | 2.5 | 2.5 | 1. |
| Amt. ECA (cc.) | 3.3 | 3.3 | 3.3 | 1. |
| Catalyst | Nickel octanoate | Zinc nitrate | Copper stearate [1] | Anh. lithium bromide. |
| Amt. Catalyst (gm.) | 1 | 2.5 | 2.5 | 0.5. |
| Solvent | Tetrahydrofuran | Tetrahydrofuran | Benzene | 50:50. Chloroform, acetic anhydride. |
| Amt. Solvent (cc.) | 10 | 10 | 10 | 4. |

[1] The addition of 2 gm. of anhydrous cupric chloride after 16 hours reaction time leads to enhanced yields over an additional 16 hours.

By substituting lithium iodide for lithium bromide in Example XII, an excellent yield of the monomeric 1-cyano-1-carbethoxy butadiene-1,3 is also obtained.

*Example XIII*

As in Example I, 25 cc. of acrolein are reacted with 33.5 cc. of ethyl cyanoacetate in 22.5 cc. of acetic acid containing 0.0172 mol of lithium salicylate and 25 gm. neutral $Al_2O_3$. After 2½ hours at 60 C. a yield of 50% 1-cyano-1-carbethoxy butadiene-1,3 is obtained.

*Examples XIV–XVII*

In these examples the same procedure as in Example XIII is followed to produce 1-cyano-1-carbethoxy butadiene-1,3 except that the catalyst differs. However, the amount of catalyst is 0.0172 mol as in Example XIII. For convenience the essential information is set forth in tabular form:

TABLE III

|  | Catalyst | Percent Yield |
|---|---|---|
| XIV | Lithium salicylate (plus equimolar salicylic acid). | 59 |
| XV | Monolithium malonate | 27 |
| XVI | Lithium pyruvate | 12 |
| XVII | Lithium lactate (plus equimolar lactic acid). | 20 |

*Example XVII (a)*

1-Cyano-1-carbethoxy butadiene-1,3 is also formed by reacting 12.5 cc. of acrolein with 16.8 cc. of ethyl cyano-

*Example XVIII*

31.5 gm. α-methylacrolein are reacted with 32.5 cc. of ethyl cyanoacetate in 100 cc. of ethyl acetate containing 25 gm. of zinc chloride and 7.5 gm. of zinc acetate dihydrate. After 1 hour at 30° C., a 29% yield of 1-cyano-1-carbethoxy-3-methyl butadiene-1,3 is obtained, as determined by gas chromatographic analysis [retention time 7¾ (2), at 190° C. at a helium pressure of 30 p.s.i.].

*Example XIX*

5 gm. of α-(n-amyl) acrolein are reacted with 3.3 cc. of ethyl cyanoacetate in 10 cc. of ethyl acetate containing 2.5 gm. of zinc chloride and 0.5 gm. of zinc acetate dihydrate. After 8 hours at room temperature, a 50% yield of 1-cyano-1-carbethoxy-3-(n-amyl) butadiene-1,3 is obtained as determined by gas chromatographic analysis [retention time of 26 (1½) at 190° C. at a helium pressure of 35 p.s.i.]. 100 cc. of ether are added to the reaction product and the solution is washed successively with 100 cc. (twice) dilute HCl, with 100 cc. (twice) aqueous-methanol (3:1 by volume), with 50 cc. (twice) saturated sodium bisulfite and finally twice with 100 cc. water. The organic layer is dried and the solvent is removed to give 3.5 gm. oil which contains about 9% monomer as determined by gas chromatographic analysis [retention time 26 (1½) at 190° C. and a helium pressure of 35 p.s.i.]. Analysis confirms a monomer-polymer mixture.

Calculated: C, 70.58; H, 8.59; N, 6.33. Found: C, 70.46; H, 8.98; N, 6.71.

This oil when brominated is successfully used as a coating material as illustrated hereinafter in Table V.

Example XX 18.3 cc. of methyl vinyl ketone are reacted with 19.5 cc. of ethyl cyanoacetate in 30 cc. of ethyl acetate containing 15 gm. of zinc chloride and 3 gm. of zinc acetate dihydrate. After 21 hours at 30° C., a 21% yield of 1-cyano-1-carbethoxy-2-methyl butadiene-1,3 are obtained as determined by gas chromatographic analysis [a retention time of 10¼ (2¾) at 190° C., and a helium pressure of 30 p.s.i.].

Example XXI 2.1 gm. of propargyl aldehyde are reacted with 3.3 cc. of ethyl cyanoacetate in 10 cc. of ethyl acetate containing 2.5 gm. of zinc chloride. After 1 hour at 0–7° C., a 11% yield of 1-cyano-1-carbethoxy-butene-1-yne-3 [(β-cyano-β-carbethoxy vinyl) acetylene] is obtained as determined by gas chromatographic analysis [retention time of 7 (3) at 190° C. at a helium pressure of 25 p.s.i.].

Example XXII 3.3 cc. of ethyl cyanoacetate are reacted with 3.1 gm. (.045 mol or 50% excess) of methyl ethynyl ketone in 7.5 cc. of 2-chloro-ethanol containing 0.1 gm. of acetic acid and 2.5 gm. of zinc chloride. After 3½ days at about 3° C., a 7% yield of 1-cyano-1-carbethoxy-2-methyl-butene-1-yne-3 is obtained as determined by gas chromatographic analysis [retention of 8½ (2¾) at 190° C. at a helium pressure of 25 p.s.i.].

After standing at room temperature one day, the solution is dissolved in 50 cc. of ether and is washed successively with 100 cc. dilute HCl, twice with 50 cc. of aqueous-methanol (2:1 by volume) and then with water. The organic layer is dried and evaporated to give 2 gms. of a red oil which contains about 10% monomer and which is used successfully as a coating material as hereinafter illustrated in Table V. Addition of petroleum ether, followed by several reprecipitations (using chloroform and petroleum ether) of the insoluble material gives a reddish solid, M.P. 183–85° which is analyzed.

Calculated: C, 66.35; H, 5.51; N, 8.58. Found: C, 64.31; H, 5.48; N, 7.89.

An infrared spectrum of this material shows a very striking similarity with monomeric 1-cyano-1-carbethoxy-butadiene-1,3; that is, both spectra show conjugated nitrile (4.51–4.54μ), conjugated ester (5.75–5.80μ) and conjugated olefin (6.3–6.35μ). The absence of absorption at 5.1μ excludes significant presence of allenic structures which would arise from 1,4 polymerization of the monomer. It can therefore be concluded that the colored, solid polymer is largly the result of 3,4 polymerization.

Example XXIII 3.6 gm. of cyanomethyl ethylsulfone are reacted with 6 cc. of acrolein in 8 cc. of ethyl acetate containing 2.5 gm. of zinc chloride. After 4¼ hrs. at approximately 3° C., a 47% yield of 1-cyano-1-ethylsulfonyl butadiene-1,3 is obtained as determined by gas chromatographic analysis [retention of 7 (4¼) at 220° C. at a helium pressure of 35 p.s.i.]. The reaction solution is dissolved in 25 cc. of ethyl ether and washed several times with 5% aqueous HCl to remove starting sulfone. The ether layer is dried and the solvent is removed to give 2.34 gm. of oil (42.5% yield of mixed monomer and homopolymer). Analysis of this dienic material is as follows:

Calculated: C, 49.1; H, 5.3; N, 8.2; S, 18.7. Found: C, 49.0; H, 6.1; N, 7.2; S, 18.0.

Gas chromatography shows significant volatiles content showing a substantial content of monomeric diene, and infrared shows unsaturated nitrile (4.52μ), conjugated olefin (6.38μ) and terminal vinyl (10.06μ), thus substantiating the structure.

Example XXIV 12.5 cc. of acrolein are reacted with 10 cc. of phenyl 2-propanone in 12.5 cc. of dimethyl sulfoxide containing 5 gm. of cobalt octanoate and 2.5 gm. of anhydrous silica gel. After 10 hours at 60° C., a 29% yield of 1-acetyl-1-phenyl butadiene-1,3 is obtained as determined by gas chromatographic analysis [retention time of 16¼ (4¾) at 190° C. at a helium pressure of 30 p.s.i.] The organic reaction liquid is treated with 50 cc. of ether, washed twice with 25 cc. of water and then decanted into 100 cc. of petroleum ether and further washed (3×50 cc.). The organic layer is dried and then evaporated to give 10.2 gm. of crude (largely a mixture of starting propanone, diene and polymer). This oil is triturated several times with petroleum ether (total ca. 100 cc.) to give two fractions; A (petroleum ether soluble) and B (insoluble gummy residue), weighing 3.6 gm. and 5.0 gm. respectively. Fraction A is comprised largely of phenyl 2-propanone and desired diene, and is further increased in diene concentration by preferential extraction with n-hexane and 80% methanol-water. Fraction B is reprecipitated several times from petroleum ether to give a material suitable for coatings application as illustrated hereinafter in Table V.

Example XXV 5 cc. of acrolein are reacted with 5 gm. of cyanoacetamide in 20 cc. of trifluoroethanol containing 5 gm. of zinc chloride. After 1 hour at room temperature, a 41% yield of 1-cyano-1-acetamido butadiene-1,3 are obtained as follows: 20 cc. of 10% HCl and 25 cc. of n-hexane-benzene (1:1 by volume) are added to the reaction mixture, shaken and filtered to give 1.5 gm. whitish solid. The resulting liquor is added to 50 cc. of ether and the water layer discarded. The organic layer is dried and evaporated to give a solid which is combined with the previous material. Recrystallization from 5% HCl (containing a little alcohol) gives 3.0 gm. (41% yield) of light yellow solid. After two recrystallizations from chloroform-methanol and one from acetone the purified diene is obtained and analyzed:

Calculated: C, 59.0; H, 4.9; N, 22.9. Found: C, 60.67; H, 4.99; N, 23.5.

Infrared spectrum shows unsaturated nitrile (4.53μ), conjugated olefin (6.34μ) and terminal vinyl (10.12μ) thus substantiating the dienic structure.

Example XXVI 5 cc. of acrolein are reacted with 3 gm. of phenyl-acetaldehyde in 5 cc. of dimethylsulfoxide containing 1.5 gm. of cobalt octanoate. After 7 hours at 50° C. a 5% yield of 1-formyl-1-phenyl butadiene-1,3 is obtained as determined by gas chromatographic analysis [retention of 14¾ (3¾) at 190° C. at a helium pressure of 30 p.s.i.].

Example XXVII 2.5 cc. of acrolein are reacted with 2.5 cc. of benzyl cyanide in 2.5 cc. of dimethyl sulfoxide containing 50 mg. of lithium octanoate. After ½ hour at 70° C. a 7% yield of 1-cyano-1-phenyl butadiene-1,3 are obtained as determined by gas chromatographic analysis [retention time of 17½ (6) at 190° C. at a helium pressure of 30 p.s.i.].

Example XXVIII

In this example, the active methylene compound serves as solvent. 5 cc. of acrolein are reacted with 10 cc. of benzyl cyanide containing 2.5 gm. of copper octanoate, 2.5 gm. of anhydrous silica gel and as antioxidant, 4,4′-thiobis (6-tert.-butyl-o-cresol). After 15 hours at 65° C., 12% yield of 1-cyano-1-phenyl butadiene-1,3, is obtained.

Employing 5 cc. of acrolein, 5 cc. of benzyl cyanide, 5 cc. of dimethyl sulfoxide, 0.1 gm. of antioxidant and 1.5 gm. of copper octanoate leads to 22% diene formation after 2 hrs. at about 65° C. Material of analytical purity is obtained as follows: the organic liquor is taken up in petroleum ether-ether (3:1 by volume) and washed successively with dilute HCl (twice), 5% Na$_2$CO$_3$ (twice) and finally dilute acid. The organic layer is dried and concentrated. The viscous oil is further triturated with petroleum ether to give a soluble fraction which consists largely of the desired diene and benzyl cyanide. Separation is effected by solid-liquid chromatography using anhydrous alumina as adsorbent and petroleum ether and finally petroleum ether-ether (3:1 by volume) as eluent. A fraction is obtained which, after recrystallization from n-hexane, melts at 29–30° C.

Calculated: C, 85.2; H, 5.8; N, 9.0. Found: C, 84.97; H, 5.84; N, 9.04.

This material shows significant volatiles content in the gas chromatograph showing a substantial content of the monomeric diene, and infrared shows unsaturated nitrile (4.54μ), conjugated olefin (6.33μ) and terminal vinyl (10.14μ) thus substantiating the structure.

Example XXIX 7.5 cc. α-chloroacrolein are reacted with 5 cc. of ethyl cyanoacetate in 10 cc. of acetic anhydride and 10 cc. of chloroform containing 2.5 gm. lithium bromide. After 2½ hrs. at 43–45° C., approximately 50% of the ester reacts to give an 8% yield of 1-cyano-1-carbethoxy-3-chloro-butadiene-1,3 as determined by gas chromatographic analysis [retention of 11½ (2¼) at 190° C. at a helium pressure of 25 p.s.i.].

The reaction solution is added to 50 cc. of petroleum ether and the solution is washed successively with 100 cc. (twice) dilute HCl, and twice with 50 cc. of aqueous-methanol (3:1 by volume), dilute HCl, saturated sodium bisulfite and dilute HCl. The organic solution is dried and evaporated to give an oil which is then rewashed with 50 cc. of aqueous-methanol (2:1 by volume), dilute HCl, saturated sodium bisulfite and dilute HCl, to give 3.1 gm. of a thick oil. Gas chromatography shows that 3% of this material is monomer. This oil is used successfully as a coating material as illustrated hereinafter in Table V. A portion of the polymer is precipitated with petroleum ether, and after several precipitations from chloroform solution a solid is obtained, M.P. 165–175° C. Analysis confirms the material as homopolymer.

Calculated: N, 7.55; Cl, 19.13. Found: N, 7.78; Cl, 19.52.

Example XXX 2.5 cc. of acrolein are reacted, at room temperature, with 5.4 gm. of cyanomethyl phenyl sulfone in 10 cc. of ethyl acetate containing 2.5 gm. of zinc chloride to give 1-cyano-1-benzenesulfonyl butadiene-1,3.

Example XXXI 15 cc. of acrolein are reacted with 10.6 gm. of di-ethyl-phosphono-acetonitrile in 10 cc. of ethyl acetate containing 5 gm. of zinc chloride. The reaction is kept at −5° to +2° C. for 10¼ hrs. The reaction solution is then treated with 500 cc. of ether-petroleum ether (1:2 by volume) and washed twice with water (25 cc. and then 50 cc.) containing a trace of acetic acid. The organic layer is dried and the solvent is removed by non-thermal evaporation to give 2.21 gms. of mobile liquid product containing about 76% of monomeric 1-cyano-1-diethyl-phosphono-butadiene-1,3 as determined by gas chromatographic analysis [retention of 7¾ (4¼) at 220° C. at a helium pressure of 35 p.s.i.]. This material is readily polymerized by addition of piperidine or sodium hydroxide solution. Analysis is confirmed.

Calculated: C, 50.3; H, 6.5; P, 14.4; N, 6.5. Found: C, 49.7; H, 6.9; P, 14.3; N, 6.7.

Gas chromatography shows significant volatiles content showing a substantial content of the monomeric diene, and infrared shows unsaturated nitrile (4.52μ) and conjugated olefin (6.37μ) thus substantiating the structure.

Example XXXII 2 cc. of acrolein are seacted at room temperature, with 2.2 gm. of benzoyl acetonitrile in 5 cc. of ethyl acetate containing 1.3 gm. of zinc chloride to give 1-benzoyl-1-cyano-butadiene-1,3.

Example XXXIII 4.0 gm. (0.03 mol) of α-phenyl acrolein are reacted, at 0–5° C., with 3.3 cc. of ethyl cyanoacetate in the presence of 2.5 gm. of zinc chloride, in 10 cc. of 2-chloro-ethanol (containing about 0.1% hydrogen chloride) to give 1-cyano-1-carbethoxy-3-phenyl butadiene-1,3.

Example XXXIV 10 c. of acrolein are reacted with 4.8 gm. of diethyl malonate in 20 cc. of 2-chloroethanol containing 5 gm. of zinc chloride. After 2 hours at about 10° C., about a 15% yield of 1,1-dicarbethoxy butadiene-1,3 are obtained as determined by gas chromatographic analysis [retention time of 12 (3¼) at 190° C. at a helium pressure of 25 p.s.i.].

By employing methylacrolein in place of acrolein, there is obtained 1,1-dicarbethoxy-3-methyl-butadiene-1,3 [retention of 15 (3¼) at 190° C. at a helium pressure of 25 p.s.i.].

Example XXXV

A mixture of 17.6 cc. of acetic acid, 0.13 gm. of salicylic acid, 0.05 gm. of lithium acetate dihydrate and 8.6 gm. of malononitrile is dissolved by gentle heating 10 gm. of Al$_2$O$_3$ are added, the mixture heated to 60° C. and 11.2 gm. (0.16 mol) of α-methylacrolein are added. After four hours, 1,1-dicyano-3-methyl butadiene-1,3 is obtained in about 20% yield as determined by gas chromatographic analysis [retention time of 7 (2¾) at 190° C. at a helium pressure of 20 p.s.i.]. Infrared also substantiates increasing yield of product in going from two to four hours reaction time.

EXAMPLE XXXVI

This example illustrates the use of novel products of the present invention as metal adhesives. Approximately 100 mg. of fluid monomer sample are spread uniformly over an area ½″ x 1″ of grit-blasted steel plates. The plates are then exposed 3–5 seconds to methyl amine vapor (generated by dropping KOH pellets in 40% aqueous amine solution). Sets of the coated plates are then brought together with the coating between, placed under mild pressure for 10–15 minutes, heated at 50° for 10 minutes without pressure (the product of Example XXIII required no heating) and then subjected to 500 p.s.i. pressure for 30–35 minutes. Resulting lap shear test results are recorded in Table IV.

TABLE IV.—ADHESION RESULTS UTILIZING 1,1,DISUBSTITUTED DI-UNSATURATED MATERIALS

| Material | Adhesive Bond (p.s.i.) |
| --- | --- |
| 1-cyano-1-carbethoxy-butadiene [1] (of Example I) | 800 |
| 1-cyano-1-diethyl phosphonobutadiene [2] (of Example XXXI) | 222 |
| 1-cyano-1-ethylsulfonylbutadiene [2] (of Example XXIII) | 216 |

[1] Material of approximate analytical purity.
[2] Material contains up to 5% solvent and a significant amount of homopolymer.

Example XXXVII

This example illustrates the use of novel products of the present invention as protective coatings for metals. Gums or viscous oils identified in the following table are mixed with approximately 10 weight percent of accelerator and the uniform mixture applied to approximately 1 inch at one end of an aluminum (an alloy containing 93% Al) strip of dimensions 4.3″ x 0.24″ x .0204″. The coated metal strip is suitably thermally treated and then immersed in aqueous 5% hydrochloric acid at room temperature for a given time. The samples are then removed, washed well with distilled water, blown with nitrogen and then dried to constant weight in an oven at about 100° C. to determine loss in weight. The results are tabulated in Table V.

TABLE V

| Polymeric Material | Accelerator | Curing Conditions | Immersion Time (min.) | Immersion Depth (cm.) | | Weight of Coating (mg.) | Weight Loss (mg.) | |
|---|---|---|---|---|---|---|---|---|
| | | | | Control | Sample | | Control | Sample |
| 1-cyano-1-carbethoxy-3-(n-amyl)butadiene-1,3 (of Example XIX) (Brominated)[1] | See footnote [2] | 1 hr. at 150°C., ¾ hr. at 175° | 58 | 1.6 | 1.65 | 66.3 | 36.0 | 0.0 |
| 1-cyano-1-carbethoxy-3-chlorobutadiene-1,3 (of Example XXIX) | ---do--- | 20 min. at 125°, 2 hrs. at 150° | 130 | +1.3 | 1.1 | 27 | 131.0 | [3]2.3 |
| 1-cyano-1-carbethoxy-2-methylbutene-1-yne-3 (of Example XXII) | N-methylaniline | 30 min. at 120° | 90 | 1.6 | 1.6 | | 21 | [3]0.3 |
| 1-acetyl-1-phenylbutadiene-1,3 (of Example XXIV) | 1,6-diaminohexane[4] | 40 min. at 100° | 157 | 1.3 | 1.2 | 67.3 | 31.8 | 0.0 |

[1] A solution of this polymer was treated with a slight molar excess of bromine at room temperature and then the volatile components removed.
[2] Piperazine di-N-nitroso-p-phenylenedihydroxylamine (1:1 adduct).
[3] Weight loss largely due to peeling of the coating and not reaction of the aluminum with HCl.
[4] Approximately 7 weight percent of this material was used.

Modification is possible in the selection of specific materials and combinations thereof, as well as in processing techniques without departing from the scope of the present invention.

I claim:
1. 1,1-disubstituted diunsaturated compounds having a formula selected from the group consisting of

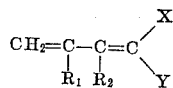

and

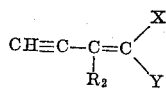

where $R_1$ is selected from the group consisting of hydrogen, alkyl groups containing from 1 to 5 carbon atoms, phenyl and halogen; where $R_2$ is selected from the group consisting of hydrogen and methyl, and where X and Y are dissimilar and are separately selected from the group consisting of cyano, carbethoxy, ethyl sulfone, phenyl sulfone, formyl, acetyl, benzoyl, diethyl phosphonyl, amide and phenyl.

2. The products of claim 1 wherein X is cyano and Y is carbethoxy.
3. The products of claim 1 wherein $R_1$ is hydrogen.
4. The products of claim 1 wherein $R_2$ is hydrogen.
5. The products of claim 1 wherein $R_1$ is halogen.
6. 1-cyano-1-carbethoxy butadiene-1,3.
7. 1-cyano-1-carbethoxy-3-chlorobutadiene-1,3.
8. 1-cyano-1-diethyl phosphono butadiene-1,3.
9. 1-cyano-1-carbethoxy-butene-1-yne-3.
10. The method of making 1,1-disubstituted diunsaturated compounds and homopolymers thereof which comprises reacting (1) an α,β-unsaturated carbonyl compound having a formula selected from the group consisting of

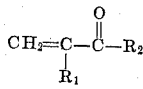

and

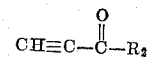

(2) an active methylene compound having the formula

and (3) as catalyst, from about 0.01 mol to about 1 mol per mol of active methylene compound of at least one metal salt having a cation selected from the group consisting of zinc, copper, manganese, chromium, cobalt, nickel, calcium, magnesium and lithium and an anion selected from the group consisting of halogens having an atomic weight of at least 35, nitrate and carboxylates having from 1 to 18 carbon atoms; where $R_1$ is selected from the group consisting of hydrogen, alkyl groups containing from 1 to 5 carbon atoms, phenyl and halogen; where $R_2$ is selected from the group consisting of hydrogen and methyl, and where X and Y are electron-withdrawing groups, X being selected from the group consisting of cyano, carbethoxy, ethyl sulfone, phenyl sulfone, formyl, acetyl, benzoyl, diethyl, phosphonyl, amide and phenyl and Y being selected from the group consisting of cyano, carbethoxy, ethyl sulfone, phenyl sulfone, formyl, acetyl, benzoyl, diethyl phosphonyl and amide, provided that when X is phenyl the catalyst selected is a carboxylate and $R_1$ and $R_2$ are each hydrogen.

11. The method of claim 10 wherein the sum of the electron-withdrawing powers of X and Y, in terms of Hammett para σ values, is at least +0.95, and wherein the pH of the reaction mixture is no greater than about 5.

12. The method of claim 10 wherein the sum of the electron-withdrawing powers of X and Y, in terms of Hammett para σ values, is between +0.75 and +0.95, and wherein the pH of the reaction mixture is between about 5 and about 7.

13. The method of claim 10 wherein the sum of the electron-withdrawing powers of X and Y, in terms of Hommett para σ values, is no greater than +0.75, and wherein the pH of the reaction mixture is at least about 7.

14. The method of claim 10 wherein there are, per mol of active methylene compound, between about 1 and about 1.3 mols of α,β-unsaturated carbonyl and between about 0.01 and about 1 mol of catalyst.

15. The method of claim 10 wherein there are, per mol of active methylene compound, approximately 1.2 mols of α,β-unsaturated carbonyl and between about 0.1 and about 0.7 mol of catalyst.

16. The method of claim 10 wherein said α,β-unsaturated carbonyl compound is acrolein.

17. The method of claim 10 wherein said active methylene compound is ethyl cyanoacetate.
18. Homopolymers of the compounds of claim 1.
19. Homopolymers of the compounds of claim 2.
20. The method of claim 10 wherein said catalyst is present in an amount from about 0.1 to about 0.7 mol per mol of active methylene compound.

References Cited by the Examiner
UNITED STATES PATENTS
2,579,008  12/1951  Naps et al. _____ 260—85.5

JOSEPH L. SCHOFER, *Primary Examiner.*
HARRY WONG, JR., *Assistant Examiner.*